Feb. 11, 1930.  W. E. GOOD  1,747,112
ICE CREAM HOLDER
Filed Aug. 21, 1928
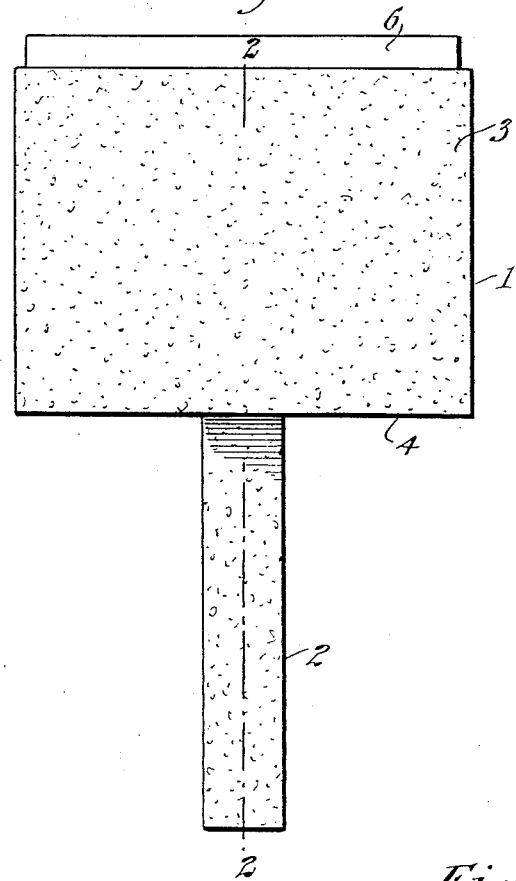
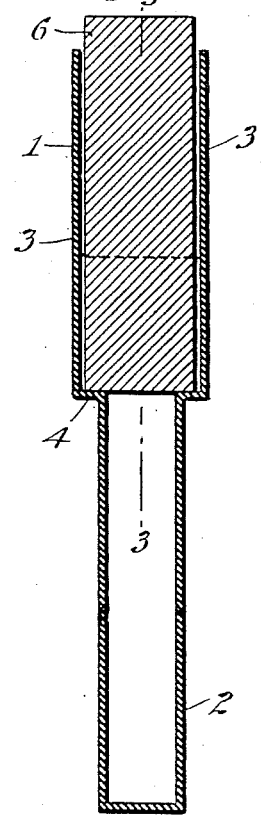
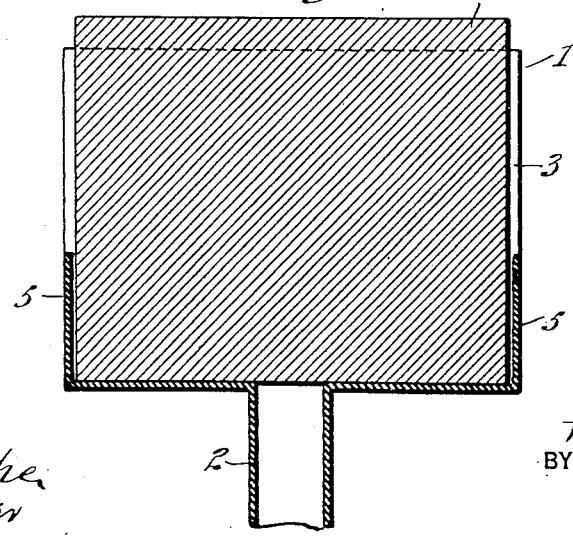
WITNESSES
INVENTOR
W. E. Good
BY
ATTORNEY Patented Feb. 11, 1930

1,747,112

UNITED STATES PATENT OFFICE

WARREN E. GOOD, OF HARRISBURG, PENNSYLVANIA

ICE-CREAM HOLDER

Application filed August 21, 1928. Serial No. 301,130.

This invention relates to ice cream holders, and more particularly to an edible holder which when containing a block of ice cream constitutes in effect an ice cream sandwich and a convenient means for holding the same.

The primary object of my invention is to provide an ice cream holder which can be conveniently handled without soiling the hands from melting ice cream, and which will provide a receptacle in the handle portion of the holder in which any liquid may collect, allowing the ice cream and the main portion of the holder to be eaten after the manner of an ice cream sandwich.

A further object is to provide an ice cream holder of this character which will be neat and attractive in appearance and which can be sold at an extremely low price.

With these and other objects in view, the invention consists in certain novel features of construction and combinations and arrangements of parts, which will be more fully hereinafter described and pointed out in the claims.

In the accompanying drawings—

Figure 1 is a view in side elevation of my improved ice cream holder with a block of ice cream in position thereon;

Figure 2 is a view in transverse section on the line 2—2 of Figure 1;

Figure 3 is a view in section at right angles to Figure 2, the view being taken on the line 3—3 of Figure 2.

1 represents the holder and 2 the handle of my improved device. Both the holder and the handle are of an edible confection commonly known as cake although of course it may be of any edible material of thin wafer-like form.

The holder 1 is of general oblong shape having sides 3, 3, a bottom 4 and short end sections 5, 5 which extend upwardly from the bottom to a height sufficient to give stability to the sides 3 and prevent any possibility of a block of ice cream 6 in the holder from sliding out of the ends of the holder.

The handle 2 is hollow and communicates with the interior of the holder, that is to say, the holder has an opening in its bottom registering with the hollow handle, so that liquid, as a result of melting ice cream, will collect in the handle and not escape from the sides of the holder.

When a cake of ice cream is in position in the holder, the handle 2 can be grasped, and the block or cake of ice cream and the holder eaten after the manner of an ice cream sandwich, and this operation can be performed with comfort and without danger of soiling the hands or clothes of the user.

It is of course to be understood that the device may be made of any suitable size and shape and design, but in effect the holder with the ice cream therein will constitute a sandwich having a handle thereon for holding the same.

While I have illustrated what I believe to be a preferred embodiment of my invention, it is obvious various changes and alterations might be made in the general form of the parts described without departing from my invention and hence I do not limit myself to the precise details set forth but consider myself at liberty to make such changes and alterations as fairly fall within the spirit and scope of the appended claim.

I claim:

An ice cream holder adapted to hold a relatively narrow block of ice cream in upright position, said holder composed of edible material comprising a pair of flat parallel sides, a bottom connecting the sides, end pieces connecting the bottom and sides and extending upwardly a distance less than the height of the sides, said bottom having a central opening therein, and a hollow handle integral with the bottom and communicating with the opening in the bottom for the reception of melted ice cream, said handle having a closed bottom.

WARREN E. GOOD.